US006961549B2

(12) United States Patent
Mori

(10) Patent No.: US 6,961,549 B2
(45) Date of Patent: Nov. 1, 2005

(54) METHOD FOR RECORDING AN AUDIO BROADCAST BY USER PREFERENCE

(75) Inventor: Robert F. Mori, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 866 days.

(21) Appl. No.: 09/921,391

(22) Filed: Aug. 2, 2001

(65) Prior Publication Data

US 2003/0028613 A1 Feb. 6, 2003

(51) Int. Cl.[7] .................................................. H04Q 7/20

(52) U.S. Cl. ............................... 455/179.1; 455/186.1; 455/3.04

(58) Field of Search ............................... 455/2.01, 3.01, 455/3.03, 3.04, 3.06, 173.1, 179.1, 184.1, 185.1, 186.1, 150.1, 563; 704/201, 235, 246, 251, 275; 386/46, 125, 83; 369/1, 6, 7

(56) References Cited

U.S. PATENT DOCUMENTS 5,862,104 A * 1/1999 Matsumoto .................... 369/7
5,946,050 A * 8/1999 Wolff ......................... 348/553
6,363,440 B1 * 3/2002 Stepp et al. .................. 710/52
6,490,686 B1 * 12/2002 Wheeler ..................... 713/200
6,782,186 B1 * 8/2004 Covell et al. ................. 386/46
6,810,526 B1 * 10/2004 Menard et al. ............... 725/46
6,816,858 B1 * 11/2004 Coden et al. .................. 707/5
2002/0044633 A1 * 4/2002 Nabha et al. ............ 379/90.01
2002/0067805 A1 * 6/2002 Andrews .................. 379/67.1
2002/0143531 A1 * 10/2002 Kahn ......................... 704/235
2002/0161578 A1 * 10/2002 Saindon et al. ............. 704/235

OTHER PUBLICATIONS

Radio TM Telematics System Website—An Overview Website (1 pg.).
Digital DNA from Motorola—Motorola; Radio TM Telematics System Driving Innovation (1 pg.).
Motorola Website—In the News Press Releases Motorola Unveils i Radio TM @ CES2000; Wireless Web Access Coming Soon to a Car Near You—Jan. 6, 2000.

* cited by examiner

*Primary Examiner*—Jean Gelin
(74) *Attorney, Agent, or Firm*—Osha Liang LLP

(57) ABSTRACT

A method for recording an audio broadcast by user preference has been developed. The method includes recording an audio broadcast and then converting the broadcast to text. The text is then scanned for content that has been designated as preferred by the user. If such content if found in the text, the recording of the audio broadcast is saved for future use.

19 Claims, 2 Drawing Sheets

METHOD FOR RECORDING AN AUDIO BROADCAST BY USER PREFERENCE

BACKGROUND OF INVENTION

1. Field of the Invention

The invention relates generally to recording of audio broadcasts.

2. Background Art

Audio broadcast media has significant advantages in providing information and entertainment to a listener. One such benefit is the novelty of its content. An audio broadcast may vary its content from day to day and even minute to minute. For example, songs, programs, and interviews will change daily while breaking news stories will change continuously.

Unfortunately, if a user is not listening in at the time of the broadcast, he or she will miss the content of interest. A prior art method of solving this problem involves pre-recording a scheduled broadcast for later playback. However, this requires the user to be aware of the time of the broadcast prior to its occurrence and to schedule the recording. Without such prior knowledge of the schedule, any such recording would contain a good deal of unwanted content. A solution is needed that allows for recording of broadcast material based on a user's preferences that can be played back at a later time.

SUMMARY OF INVENTION

In some aspects, the invention relates to a method for recording an audio broadcast by user preference, comprising: recording an audio broadcast; converting the audio broadcast to a text media; searching the text media for a designated user preference; and saving the audio broadcast when the designated user preference is found in the text media.

In other aspects, the invention relates to an apparatus for recording an audio broadcast by user preference, comprising: means for recording an audio broadcast; means for mining the audio broadcast for a designated user preference; and means for saving the audio broadcast when the designated user preference is found in the audio broadcast.

In other aspects, the invention relates to an apparatus for recording an audio broadcast by user preference, comprising: a recorder that records an audio broadcast; an audio miner that converts the audio broadcast to a text media; a search engine that searches the text media for a designated user preference; and a storage media that saves the audio broadcast when the designated user preference is found in the audio broadcast.

Other aspects and advantages of the invention will be apparent from the following description and the appended claims.

DETAILED DESCRIPTION

Figure 1:
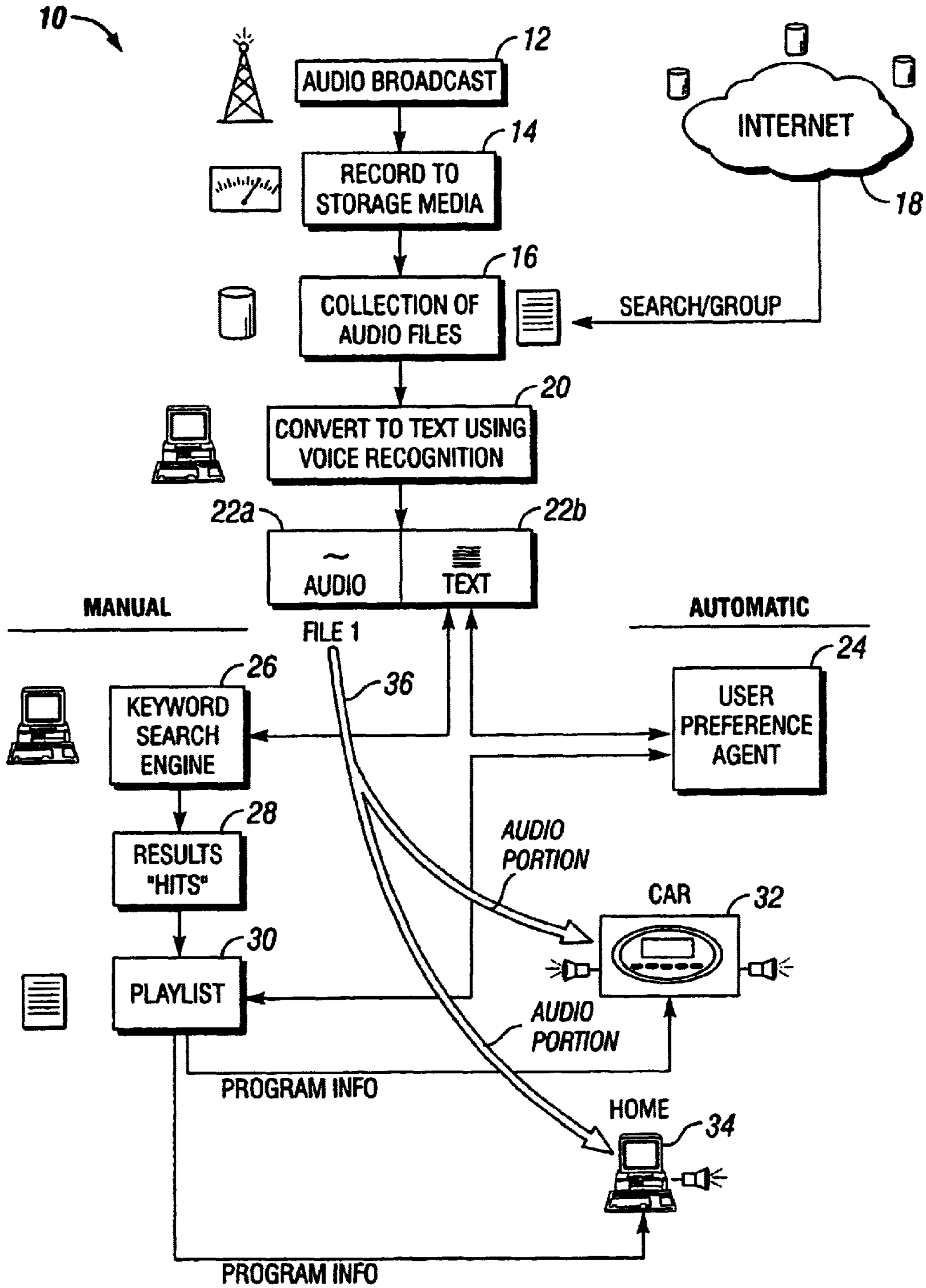
FIG. 1 shows a flowchart outlining one embodiment of the present invention.

Exemplary embodiments of the invention will be described with reference to the accompanying drawings. Like items in the drawings are shown with the same reference numbers.

An audio receiver has been developed that uses audio mining techniques to record audio material for later playback by the user. The selected audio material is recorded according to the user's preferences. FIG. 1 shows a flowchart 10 outlining one embodiment of the present invention. First, a radio audio broadcast 12 is recorded to a storage media 14. It may be recorded using digital recording techniques that are known to those of ordinary skill in the art. The recording is assembled into a collection of audio files 16 along with other recorded audio broadcasts which may be from other media sources such as the internet 18. The audio files 16 are converted to text files 22*b* using audio mining techniques 20. The audio mining techniques include the use of voice recognition techniques that are known to those of ordinary skill in the art. A copy of the audio portion of the file 22*a* is also kept.

A search agent or "search engine" searches the text file 26 for key words or "hits" 28 that the user has specified to be of interest. If a hit is found, the file is assigned to the appropriate user's play list 30. The audio portion of the file 22*a* is distributed 36 to either an audio player in a car 32 or a home computer 34 according to the user preference agent 24. The program can then be recalled from the play list by the user and a specific track selected within the program for playing. An individual track may vary in length. The track may be a recording of such broadcasts as: a song, an advertisement, a news story, traffic or weather information, an emergency bulletin, an interview, a sporting event, or even an entire broadcast program. The type and quantity of content that is recorded is only limited by the memory space available.

Figure 2A:
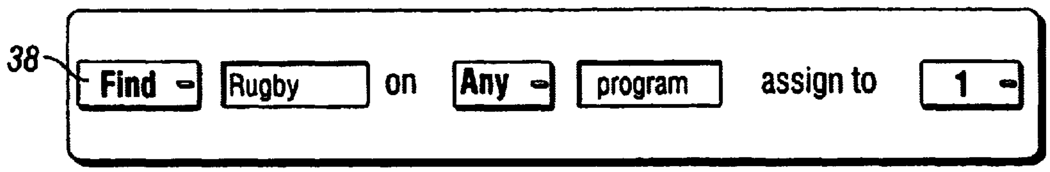
FIGS. 2*a* and 2*b* show a control panel layout in accordance with one embodiment of the present invention.
Figure 2B:
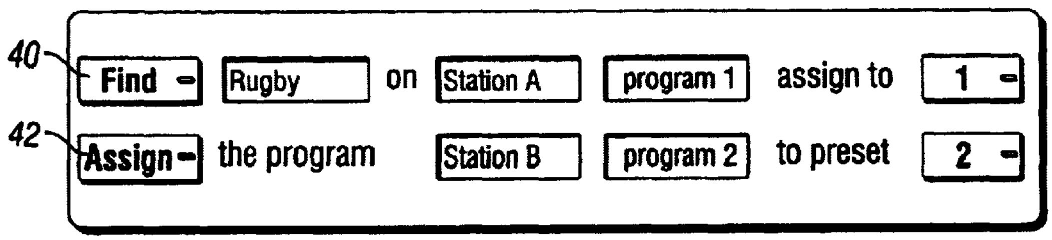

FIGS. 2*a* and 2*b* show examples of a user preference agent interface 38, 40, and 42 in accordance with alternative embodiments of the present invention. The first interface 38 illustrates a general topic user preference. In this example, the user has instructed the invention to search for material on "rugby" in any program. The second interface 40 illustrates a topic user preference directed towards a specific program on a specific station. In this example, the user has instructed the invention to search for material on "rugby" on Station A during Program 1. The third interface 42 illustrates a user preference directed towards a specific program on a specific station. In this example, the user has instructed the invention to record Station B during Program 2. These examples are by no means exhaustive. It is fully intended that the user is given the option of narrowing or broadening their preferences as desired.

Figure 3:
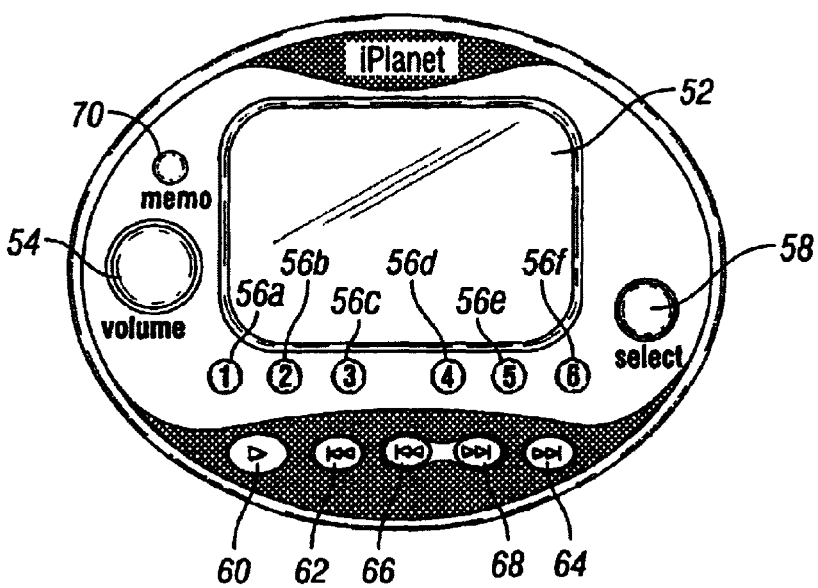
FIG. 3 shows a layout of a control panel in accordance with one embodiment of the present invention.

FIG. 3 shows a layout of a control panel 50 in accordance with one embodiment of the present invention. The control panel 50 includes an LCD 52 or other suitable type display screen that shows current information such as: the key search terms of a program; the individual track within a program; the position within a track; etc. The device of this embodiment is turned on/off and the volume is adjusted with a single knob 54 that controls both functions. In this embodiment, there are six preset buttons 56*a–f* that go directly to a specific preset program. A select control button 58 is available to navigate through all available programs. Also included are several control buttons that control the playing of individual tracks. These control buttons include: a play/pause button 60; a "go to previous track" button 62; a "go to next track" button 64; a review rocker 66; and a fast forward rocker 68. The rockers advance the track a few seconds when they are pressed. In contrast, the track buttons go to or return to the beginning of the adjacent track. Finally, a memo button 70 is used to initiate the recording of some audio presently in progress, or it can be used to mark a current track for later reference.

While the invention has generally been directed towards recording audio broadcasts over the radio, broadcasts from other types of media sources could be recorded as well including: internet streaming audio or video; compact discs (CDs); cassette tapes; digital versatile discs (DVDs); etc. Additionally, in some embodiments the invention may be installed in a automobile or in alternative embodiments it may be used as a portable device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for recording an audio broadcast by user preference, comprising:

obtaining a first preference designated by a user, the first preference related to a plurality of segments of an audio broadcast;

obtaining a second preference designated by the user, the second preference being at least one keyword;

recording an audio broadcast based on the first preference;

converting the recorded audio broadcast to at least one text file;

searching the at least one text file for the at least one keyword; and if the at least one keyword is found, digitally saving at least one of the plurality of the segments having the keyword to a playlist for the user for future playback.

2. The method of claim 1, wherein the audio broadcast is a radio broadcast.

3. The method of claim 1, wherein the audio broadcast is an internet broadcast.

4. The method of claim 1, wherein the audio broadcast is a memory storage media broadcast.

5. The method of claim 4, wherein the memory storage media is a compact disc.

6. The method of claim 4, wherein the memory storage media is a digital versatile disc.

7. The method of claim 1, wherein the audio broadcast is converted to the at least one text file by voice recognition techniques.

8. The method of claim 1, wherein the at least one text file is searched for the second preference with a search agent.

9. The method of claim 1, the first preference relating to at least one of a broadcast station, a program, a time period, a date, and a type of programming.

10. An apparatus for recording an audio broadcast by user preference, comprising:

means for obtaining a first preference designated by a user, the first preference related to a plurality of segments of an audio broadcast;

means for obtaining a second preference designated by the user, the second preference being at least one keyword;

means for recording an audio broadcast based on the first preference;

means for mining the recorded audio broadcast based on the second user preference; and means for digitally saving the audio broadcast to a playlist for the user for future playback if the at least one keyword is found in the audio broadcast.

11. The apparatus of claim 10, the first preference relating to at least one of a broadcast station, a program, a time period, a date, and a type of programming.

12. An apparatus for recording an audio broadcast by user preference, comprising:

a recorder that records an audio broadcast based on a first user preference, the first preference related to a plurality of segments of an audio broadcast;

an audio miner that converts the audio broadcast to at least one text file;

a search engine that searches the at least one text file based on a second user preference, the second preference being at least one keyword; and a storage media that digitally saves the audio broadcast to a playlist for the user for future playback if the at least one keyword is found in the audio broadcast.

13. The apparatus of claim 12, wherein the audio broadcast is a radio broadcast.

14. The apparatus of claim 12, wherein the audio broadcast is an internet broadcast.

15. The apparatus of claim 12, wherein the audio broadcast is a memory storage media broadcast.

16. The apparatus of claim 15, wherein the memory storage media is a compact disc.

17. The apparatus of claim 15, wherein the memory storage media is a digital versatile disc.

18. The apparatus of claim 12, wherein audio miner uses voice recognition techniques to convert the audio broadcast to the at least one text file.

19. The apparatus of claim 12, the first preference relating to at least one of a broadcast station, a program, a time period, a date, and a type of programming.

* * * * *